US 11,601,035 B2

(12) United States Patent
Chen

(10) Patent No.: US 11,601,035 B2
(45) Date of Patent: Mar. 7, 2023

(54) MOTOR CURRENT CONTROLLING CIRCUIT HAVING VOLTAGE DETECTION MECHANISM

(71) Applicant: ANPEC ELECTRONICS CORPORATION, Hsinchu (TW)

(72) Inventor: Kun-Min Chen, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 17/503,370

(22) Filed: Oct. 18, 2021

(65) Prior Publication Data

US 2023/0021728 A1     Jan. 26, 2023

(30) Foreign Application Priority Data

Jul. 21, 2021    (TW) ................................. 110126720

(51) Int. Cl.
| | |
|---|---|
| *H02P 6/15* | (2016.01) |
| *H02K 29/08* | (2006.01) |
| *H02P 6/16* | (2016.01) |
| *H02P 6/08* | (2016.01) |

(52) U.S. Cl.
CPC ............. *H02K 29/08* (2013.01); *H02P 6/085* (2013.01); *H02P 6/16* (2013.01)

(58) Field of Classification Search
CPC . H02K 29/08; H02P 6/085; H02P 6/16; H02P 6/15
See application file for complete search history.

(56) References Cited

U.S. PATENT DOCUMENTS

2017/0250634 A1*   8/2017   Ambruson ................ H02P 6/17
2019/0097553 A1*   3/2019   Sun ........................... H02P 6/15

FOREIGN PATENT DOCUMENTS

| TW | 201429149 A | 7/2014 |
|---|---|---|
| WO | 2014035658 A2 | 3/2014 |

* cited by examiner

*Primary Examiner* — Cortez M Cook
(74) *Attorney, Agent, or Firm* — Li & Cai Intellectual Property Office

(57) ABSTRACT

A motor current controlling circuit having a voltage detection mechanism is provided. A first terminal of a first low-side transistor is connected to a second terminal of a first high-side transistor. A node between the first terminal of the first low-side transistor and the second terminal of the first high-side transistor is connected to a first terminal of a motor. A first terminal of a second low-side transistor is connected to a second terminal of a second high-side transistor. A zero current detector circuit detects a voltage of the node and determines whether or not a current flowing through the motor is equal to a zero value to output a zero current detected signal according to the detected voltage. A controller circuit controls a driver circuit to turn on or off the high-side transistors and the low-side transistors according to the zero current detected signal.

9 Claims, 12 Drawing Sheets

MOTOR CURRENT CONTROLLING CIRCUIT HAVING VOLTAGE DETECTION MECHANISM

CROSS-REFERENCE TO RELATED PATENT APPLICATION

This application claims the benefit of priority to Taiwan Patent Application No. 110126720, filed on Jul. 21, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motor, and more particularly to a motor current controlling circuit having a voltage detection mechanism.

BACKGROUND OF THE DISCLOSURE

In various electronic products, circuit components produce heat during operation, so that heated air is circulated throughout an enclosed space, e.g., in an enclosed chassis of a server. As a result, other circuit components in the enclosed space are heated up by the heated air such that the other circuit components are damaged due to overheating. Therefore, fans must be configured in the electronic products and used to cool down the circuit components of the electronic products.

However, when a driver circuit turns on or off a plurality of transistors of a bridge circuit of the fan to drive the motor to rotate and blades of the fan rotate together with the motor, the transistors are heated up by the heated air circulated in the enclosed chassis. As a result, the transistors may be damaged due to overheating. Therefore, the driver circuit must accurately obtain a value of a current flowing through the motor and appropriately switch the transistors of the bridge circuit according to the value of the current, so as to prevent the transistor from being damaged by an excessive current.

SUMMARY OF THE DISCLOSURE

In response to the above-referenced technical inadequacies, the present disclosure provides a motor current controlling circuit having a voltage detection mechanism, which is applicable to a motor. The motor current controlling circuit having the voltage detection mechanism includes a bridge circuit, a zero current detector circuit, a driver circuit and a controller circuit. The bridge circuit includes a plurality of transistors. The plurality of transistors includes a first high-side transistor, a first low-side transistor, a second high-side transistor and a second low-side transistor. A first terminal of the first high-side transistor is coupled to a common voltage. A first terminal of the first low-side transistor is connected to a second terminal of the first high-side transistor. A first node between the first terminal of the first low-side transistor and the second terminal of the first high-side transistor is connected to a first terminal of the motor. A second terminal of the first low-side transistor is grounded. A first terminal of the second high-side transistor is coupled to the common voltage. A first terminal of the second low-side transistor is connected to a second terminal of the second high-side transistor. A second node between the first terminal of the second low-side transistor and the second terminal of the second high-side transistor is connected to a second terminal of the motor. A second terminal of the second low-side transistor is grounded. The zero current detector circuit is connected to the motor. The zero current detector circuit is configured to detect one or both of a voltage of the first node and a voltage of the second node as a first voltage and a second voltage, respectively, and wherein the zero current detector circuit, according to one or both of the first voltage and the second voltage, determines whether or not a current flowing through the motor is equal to a zero value for outputting a current detected signal. The driver circuit is connected to a control terminal of each of the plurality of transistors. The driver circuit is configured to turn on or off each of the plurality of transistors. The controller circuit is connected to the driver circuit and the zero current detector circuit. The controller circuit is configured to control the driver circuit according to the current detected signal.

In the embodiments, the motor current controlling circuit having the voltage detection mechanism further includes a Hall sensor. The Hall sensor is connected to the controller circuit. The Hall sensor is configured to sense a positive voltage and a negative voltage that are generated with a change in magnetic field strength from rotation of a rotor of the motor, so as to output a Hall signal. The controller circuit controls the driver circuit based on the Hall signal.

In the embodiments, the motor current controlling circuit having the voltage detection mechanism further includes a Hall signal unit. The Hall signal unit is connected between the Hall sensor and the controller circuit. The Hall signal unit is configured to generate a Hall level signal according to a level of the Hall signal from the Hall sensor. The controller circuit controls the driver circuit according to the Hall level signal.

In the embodiments, when the controller circuit, according to the Hall level signal and the current detected signal, determines that the current of the motor is not equal to the zero value during a time interval that is near a transition time point of the Hall level signal, the controller circuit controls the driver circuit to switch the bridge circuit such that a time point at which the motor commutates is adjusted, and the current of the motor is equal to the zero value during the time interval that is near the transition time point of the Hall level signal.

In the embodiments, the controller circuit determines a value of the current of the motor according to the current detected signal. When the controller circuit determines that the current of the motor is not equal to the zero value during a time interval that is near a transition time point of a signal of the first voltage or the second voltage, the controller circuit controls the driver circuit to switch the bridge circuit to extend or shorten a length of a time during which the first voltage of the first node is equal to the second voltage of the second node.

In the embodiments, the motor current controlling circuit having the voltage detection mechanism further includes a resistor and a current limiting circuit. A first terminal of the resistor is connected to the second terminal of the first low-side transistor and the second terminal of the second low-side transistor. A second terminal of the resistor is grounded. The current limiting circuit is connected to the first terminal of the resistor and the controller circuit. The current limiting circuit is configured to detect a voltage of the resistor. The current limiting circuit, according to a voltage of the resistor, determines whether or not a current flowing through the resistor is larger than a threshold or falls within a threshold range to output a current limiting signal to the controller circuit. The controller circuit controls the driver circuit according to the current limiting signal.

In the embodiments, the zero current detector circuit includes a comparator and a logic circuit. A first input terminal of the comparator is coupled to a reference voltage. A second input terminal of the comparator is connected to the first node. The comparator compares the first voltage with the reference voltage to output a comparing signal. The logic circuit is connected to an output terminal of the comparator and the controller circuit. The logic circuit, according to the comparing signal, determines whether or not the current flowing through the motor is equal to the zero value to output the current detected signal.

In the embodiments, the zero current detector circuit is connected to the second node. The zero current detector circuit is configured to detect the second voltage of the second node. The zero current detector circuit, according to the second voltage, determines whether or not the current flowing through the motor is equal to the zero value to output the current detected signal.

In the embodiments, the zero current detector circuit includes a comparator and a logic circuit. A first input terminal of the comparator is connected to the second node. A second input terminal of the comparator is coupled to a reference voltage. The comparator compares the second voltage of the second node with the reference voltage to output a comparing signal. The logic circuit is connected to an output terminal of the comparator and the controller circuit. The logic circuit, according to the comparing signal, determines whether or not the current flowing through the motor is equal to the zero value to output the current detected signal.

In the embodiments, the zero current detector circuit includes a first comparator, a second comparator and a logic circuit. A first input terminal of the first comparator is coupled to a first reference voltage. A second input terminal of the first comparator is connected to the first node. The first comparator compares the first voltage with the first reference voltage to output a first comparing signal. A first input terminal of the second comparator is connected to the second node. A second input terminal of the comparator is coupled to a second reference voltage. The second comparator compares the second voltage of the second node with the second reference voltage to output a second comparing signal. The logic circuit is connected to an output terminal of the first comparator, an output terminal of the second comparator and the controller circuit. The logic circuit, according to the first comparing signal and the second comparing signal, determines whether or not the current flowing through the motor is equal to the zero value to output the current detected signal.

As described above, the present disclosure provides the motor current controlling circuit having the voltage detection mechanism, which has the following characteristics:

1. the first voltage of the first node between the first terminal of the first low-side transistor and the second terminal of the first high-side transistor can be detected, and the motor current controlling circuit determines whether or not the current flowing through the motor is equal to the zero value according to the detected first voltage;
2. the second voltage of the second node between the first terminal of the second low-side transistor and the second terminal of the second high-side transistor can be detected, and the motor current controlling circuit determines whether or not the current flowing through the motor is equal to the zero value according to the detected second voltage;
3. the voltage of the resistor connected to the second terminal of the first low-side transistor and the second terminal of the second low-side transistor may be detected, and the motor current controlling circuit determines whether or not the current flowing through the motor is larger than the threshold according to the detected voltage of the resistor;
4. a commutation angle of the motor being driven may be automatically adjusted according to the detected current of the motor; and
5. the time length of the time interval during which the first voltage of the first terminal of the motor is not equal to but approaches the second voltage of the second terminal of the motor may be automatically adjusted according to the detected current of the motor.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
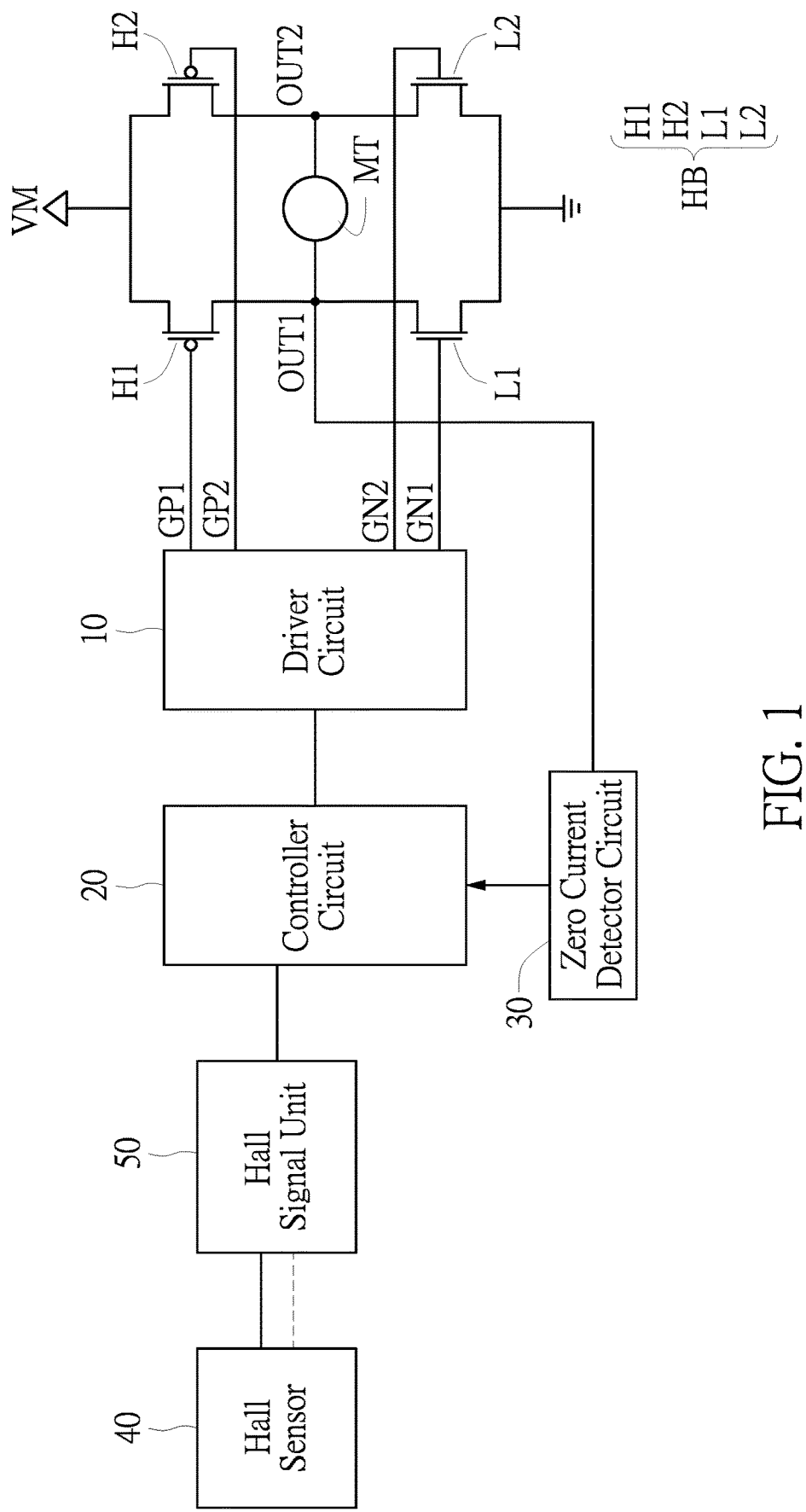
FIG. 1 is a block diagram of a motor current controlling circuit having a voltage detection mechanism according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Reference is made to FIG. 1, which is a block diagram of a motor current controlling circuit having a voltage detection mechanism according to a first embodiment of the present disclosure.

In the embodiment, the motor current controlling circuit may include a bridge circuit HB, a driver circuit 10, a controller circuit 20, a zero current detector circuit 30, a Hall sensor 40 and a Hall signal unit 50, but the present disclosure is not limited thereto. As shown in FIG. 1, the bridge circuit HB may include a plurality of transistors such as a first high-side transistor H1, a first low-side transistor L1, a second high-side transistor H2 and a second low-side transistor L2. In the embodiment, the Hall signal unit 50 is a Hall signal circuit.

A first terminal of the first high-side transistor H1 may be coupled to a common voltage VM. A second terminal of the first high-side transistor H1 may be connected to a first terminal of the first low-side transistor L1. A first node OUT1 between the first terminal of the first low-side transistor L1 and the second terminal of the first high-side transistor H1 may be connected to a first terminal of the motor MT. A second terminal of the first low-side transistor L1 may be grounded. A control terminal of the first high-side transistor H1 and a control terminal of the first low-side transistor L1 may be connected to the driver circuit 10.

A first terminal of the second high-side transistor H2 may be coupled to the common voltage VM. A second terminal of the second high-side transistor H2 may be connected to a first terminal of the second low-side transistor L2. A second node OUT2 between the first terminal of the second low-side transistor L2 and the second terminal of the second high-side transistor H2 may be connected to a second terminal of the motor MT. A second terminal of the second low-side transistor L2 may be grounded. A control terminal of the second high-side transistor H2 and a control terminal of the second low-side transistor L2 may be connected to the driver circuit 10.

The Hall sensor 40 may be connected to the controller circuit 20 and disposed on the motor MT. The Hall sensor 40 may sense a positive voltage and a negative voltage that are generated with a change in magnetic field strength of the motor MT of which a rotor is rotating to output a Hall signal. The controller circuit 20 may be connected to the driver circuit 10. The controller circuit 20 may control the driver circuit 10 to turn on or off each of the transistors of the bridge circuit HB based on the Hall signal.

If necessary, the Hall signal unit 50 may be disposed. The Hall signal unit 50 may be connected between the Hall sensor 40 and the controller circuit 20. The Hall signal unit 50 may receive the Hall signal from the Hall sensor 40 and generate a Hall level signal according to a level of the Hall signal. The controller circuit 20 may control the driver circuit 10 to turn on or off each of the transistors of the bridge circuit HB according to the Hall level signal.

It is worth noting that, the zero current detector circuit 30 may be connected to the first node OUT1 between the first terminal of the first low-side transistor L1 and the second terminal of the first high-side transistor H1. The zero current detector circuit 30 may detect a voltage of the first node OUT1 as a first voltage. The zero current detector circuit 30 may, according to the first voltage, determine whether or not a current flowing through the motor MT is equal to a zero value to output a current detected signal.

The controller circuit 20 may be connected to the zero current detector circuit 30. The controller circuit 20 may receive the current detected signal from the zero current detector circuit 30. The controller circuit 20 may, according to the current detected signal, control the driver circuit 10 to output driving signals GP1, GP2, GN1, GN2 to the bridge circuit HB to respectively turn on or off the first high-side transistor H1, the first low-side transistor L1, the second high-side transistor H2 and the second low-side transistor L2 of the bridge circuit HB. In particular, when the current of the motor MT is equal to the zero value, the controller circuit 20 may control the driver circuit 10 to appropriately switch the bridge circuit HB.

Second Embodiment

Figure 2:
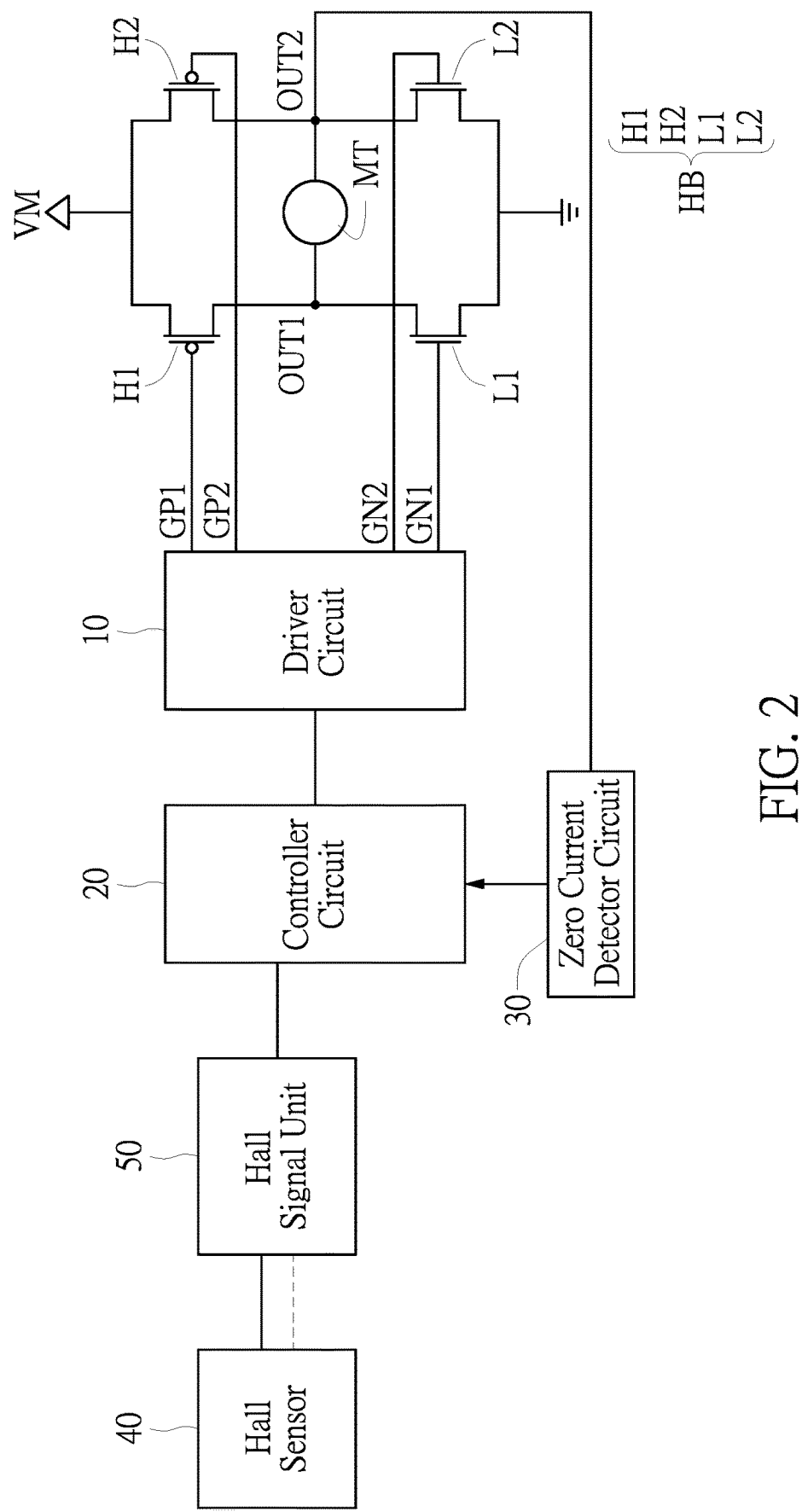
FIG. 2 is a block diagram of a motor current controlling circuit having a voltage detection mechanism according to a second embodiment of the present disclosure.

Reference is made to FIG. 2, which is a block diagram of a motor current controlling circuit having a voltage detection mechanism according to a second embodiment of the present disclosure. Details regarding this embodiment that are similar to those in the previously described embodiment will not be repeated herein.

In the first embodiment, the zero current detector circuit 30 detects the first voltage of the first node OUT1 between the first terminal of the first low-side transistor L1 and the second terminal of the first high-side transistor H1. In contrast, in the second embodiment, the zero current detector circuit 30 detects a second voltage of the second node OUT2 between the first terminal of the second low-side transistor L2 and the second terminal of the second high-side transistor H2.

In the second embodiment, the zero current detector circuit 30 may, according to the second voltage of the second node OUT2, determine whether or not the current flowing through the motor MT is equal to the zero value to output the current detected signal. The controller circuit 20 may control the driver circuit 10 to appropriately switch the bridge circuit HB according to the current detected signal.

Third Embodiment

Figure 3:
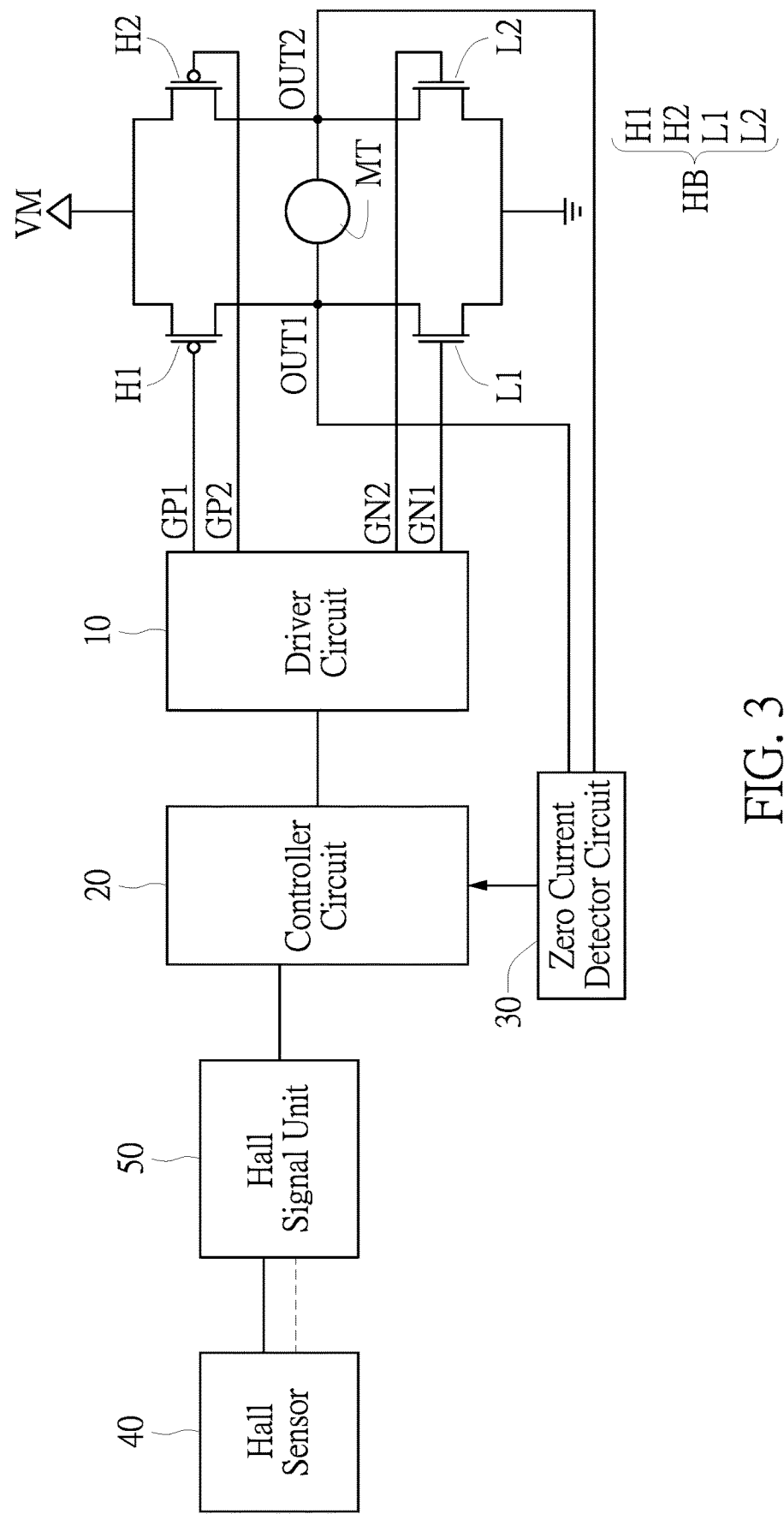
FIG. 3 is a block diagram of a motor current controlling circuit having a voltage detection mechanism according to a third embodiment of the present disclosure.

Reference is made to FIG. 3, which is a block diagram of a motor current controlling circuit having a voltage detection mechanism according to a third embodiment of the present disclosure. Details regarding this embodiment that are similar to those in the previously described embodiments will not be repeated herein.

In the embodiment, the zero current detector circuit 30 may be connected to the first node OUT1 and the second node OUT2. The zero current detector circuit 30 may, according to (a difference between) the first voltage of the first node OUT1 and the second voltage of the second node OUT2, determine whether or not the current flowing through the motor MT is equal to the zero value to output the current detected signal. The controller circuit 20 may control the driver circuit 10 to appropriately switch the bridge circuit HB according to the current detected signal.

Fourth Embodiment

Figure 4:
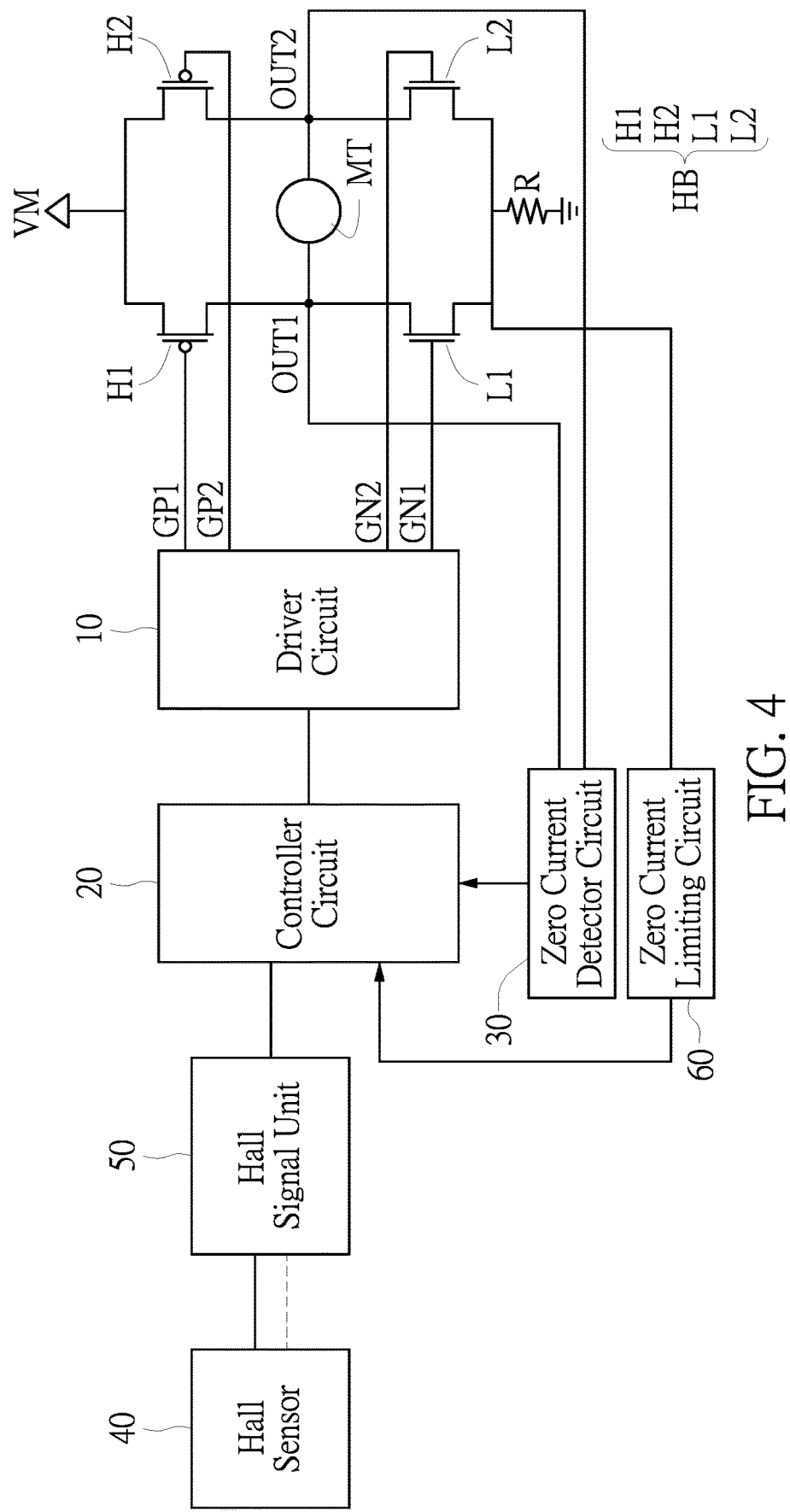
FIG. 4 is a block diagram of a motor current controlling circuit having a voltage detection mechanism according to a fourth embodiment of the present disclosure.

Reference is made to FIG. 4, which is a block diagram of a motor current controlling circuit having a voltage detection mechanism according to a fourth embodiment of the present disclosure. The same descriptions are not repeated herein.

In the embodiment, the motor current controlling circuit may include a resistor R and a current limiting circuit 60. A first terminal of the resistor R may be connected to the second terminal of the first low-side transistor L1 and the second terminal of the second low-side transistor L2. A second terminal of the resistor R may be grounded.

The current limiting circuit 60 may be connected to the first terminal of the resistor R and the controller circuit 20. The current limiting circuit 60 may detect a voltage of the resistor R. The current limiting circuit 60 may, according to the detected voltage of the resistor R, determine whether or not a current flowing through the resistor R is larger than a threshold or falls within a threshold range to output a current limiting signal.

The controller circuit 20 may be connected to the current limiting circuit 60. The controller circuit 20 may, according to the current limiting signal from the current limiting circuit 60, control the driver circuit 10 to appropriately switch the bridge circuit HB such that an amount of the current flowing through the bridge circuit HB and the motor MT is limited.

Fifth Embodiment

Figure 5:
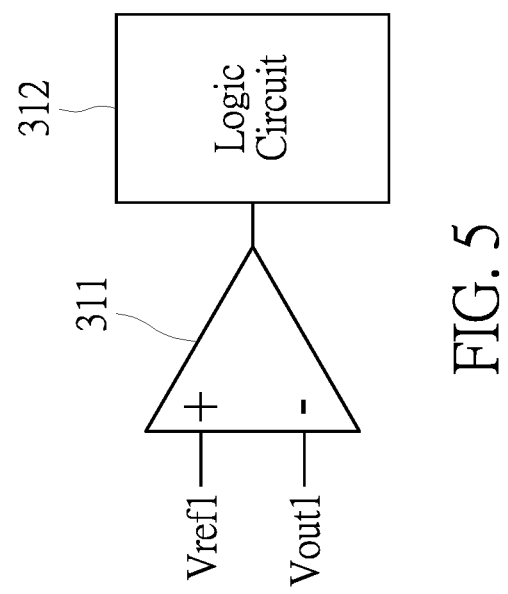
FIG. 5 is a circuit layout diagram of circuit components inside a zero current detector circuit of a motor current controlling circuit having a voltage detection mechanism according to a fifth embodiment of the present disclosure.
Figure 6:
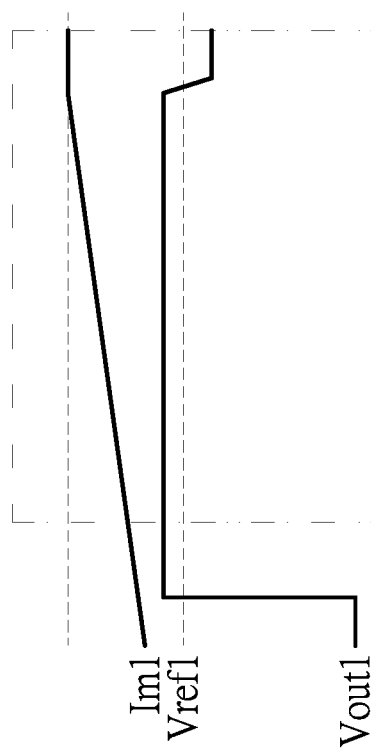
FIG. 6 is a waveform diagram of signals of the motor current controlling circuit having the voltage detection mechanism according to the fifth embodiment of the present disclosure.

Reference is made to FIGS. 5 and 6, in which FIG. 5 is a circuit layout diagram of circuit components inside a zero current detector circuit of a motor current controlling circuit having a voltage detection mechanism according to a fifth embodiment of the present disclosure, and FIG. 6 is a waveform diagram of signals of the motor current controlling circuit having the voltage detection mechanism according to the fifth embodiment of the present disclosure. The same descriptions are not repeated herein.

In the embodiment, the zero current detector circuit of the motor current controlling circuit (such as the zero current detector circuit 30 shown in FIGS. 1, 3, 4) may include a comparator 311 and a logic circuit 312 as shown in FIG. 5.

A first input terminal such as a non-inverting terminal of the comparator 311 may be coupled to a reference voltage Vref1. A second input terminal such as an inverting terminal of the comparator 311 is connected to the first node OUT1. The comparator 311 may compare a first voltage Vout1 of the first node OUT1 with the reference voltage Vref1 to output a first comparing signal.

The logic circuit 312 may be connected to an output terminal of the comparator 311 and an input terminal of a controller circuit (such as the controller circuit 20 shown in FIGS. 1 to 3). The logic circuit 312 may receive the first comparing signal from the comparator 311 within a sampling time (that may be a commutation time) as shown in a dotted line in FIG. 6. The logic circuit 312 may, according to a level of the first comparing signal, determine whether or not the current flowing through the motor MT is equal to the zero value to output the current detected signal to the controller circuit 20.

For example, when the logic circuit 312 receives the first comparing signal at a low level, the logic circuit 312 determines that the first voltage Vout1 of the first node OUT1 is higher than the reference voltage Vref1. At this time, the current flowing through the motor MT is not equal to the zero value. Conversely, when the logic circuit 312 receives the first comparing signal at a high level, the logic circuit 312 determines that the first voltage Vout1 of the first node OUT1 is lower than the reference voltage Vref1. At this time, the current flowing through the motor MT is equal to the zero value.

Sixth Embodiment

Figure 7:
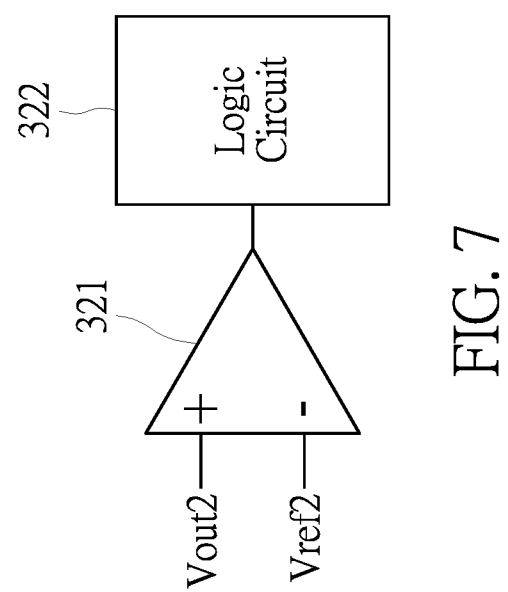
FIG. 7 is a circuit layout diagram of circuit components inside a zero current detector circuit of a motor current controlling circuit having a voltage detection mechanism according to a sixth embodiment of the present disclosure.
Figure 8:
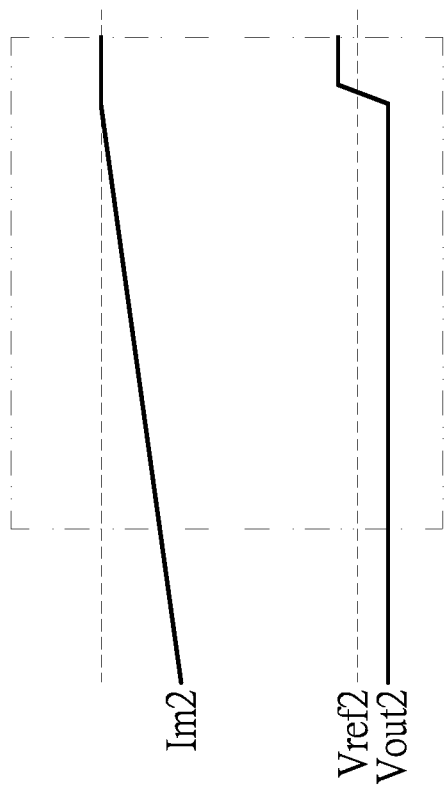
FIG. 8 is a waveform diagram of signals of the motor current controlling circuit having the voltage detection mechanism according to the sixth embodiment of the present disclosure.

Reference is made to FIGS. 7 and 8, in which FIG. 7 is a circuit layout diagram of circuit components inside a zero current detector circuit of a motor current controlling circuit having a voltage detection mechanism according to a sixth embodiment of the present disclosure, and FIG. 8 is a waveform diagram of signals of the motor current controlling circuit having the voltage detection mechanism according to the sixth embodiment of the present disclosure. The same descriptions are not repeated herein.

In the embodiment, the zero current detector circuit of the motor current controlling circuit (such as the zero current detector circuit 30 shown in FIGS. 2, 3 and 4) may include a comparator 321 and a logic circuit 322 as shown in FIG. 7.

A first input terminal such as a non-inverting terminal of the comparator 321 may be connected to the second node OUT2. A second input terminal such as an inverting terminal of the comparator 321 may be coupled to a second reference voltage Vref2. The comparator 321 may compare a second voltage Vout2 of the second node OUT2 with the reference voltage Vref2 to output a second comparing signal. The reference voltage Vref2 may be equal to or not equal to the first reference voltage Vref1 described above.

The logic circuit 322 may be connected to an output terminal of the comparator 321 and an input terminal of the controller circuit 20. The logic circuit 322 may receive the second comparing signal from the comparator 321 within a sampling time (that may be a commutation time) as shown in a dotted line in FIG. 8. The logic circuit 322 may, according to the second comparing signal, determine whether or not the current flowing through the motor MT is equal to the zero value to output the current detected signal.

For example, when the logic circuit 322 receives the second comparing signal at a low level from the comparator 321, the logic circuit 322 determines that the second voltage Vout2 of the second node OUT2 is lower than the reference voltage Vref2. At this time, the current flowing through the motor MT is not equal to the zero value. Conversely, when the logic circuit 322 receives the second comparing signal at a high level from the comparator 321, the logic circuit 322 determines that the second voltage Vout2 of the second node OUT2 is higher than the reference voltage Vref2. At this time, the current flowing through the motor MT is equal to the zero value.

The zero current detector circuit 30 of the motor current controlling circuit shown in FIG. 3 or FIG. 4 may include the comparator 311 and the logic circuit 312 that are used to detect the first voltage Vout1 of the first node OUT1, and may include the comparator 321 and the logic circuit 322 that are used to detect the second voltage Vout2 of the second node OUT2. In practice, the zero current detector circuit 30 may only include one logic circuit connected to the output terminal of the comparator 311 (as a first comparator) and the output terminal of the comparator 321 (as a second comparator). The one logic circuit is configured to perform operations similar to the above-mentioned operations performed by the logic circuit 312 and the logic circuit 322.

Seventh Embodiment

Figure 9:
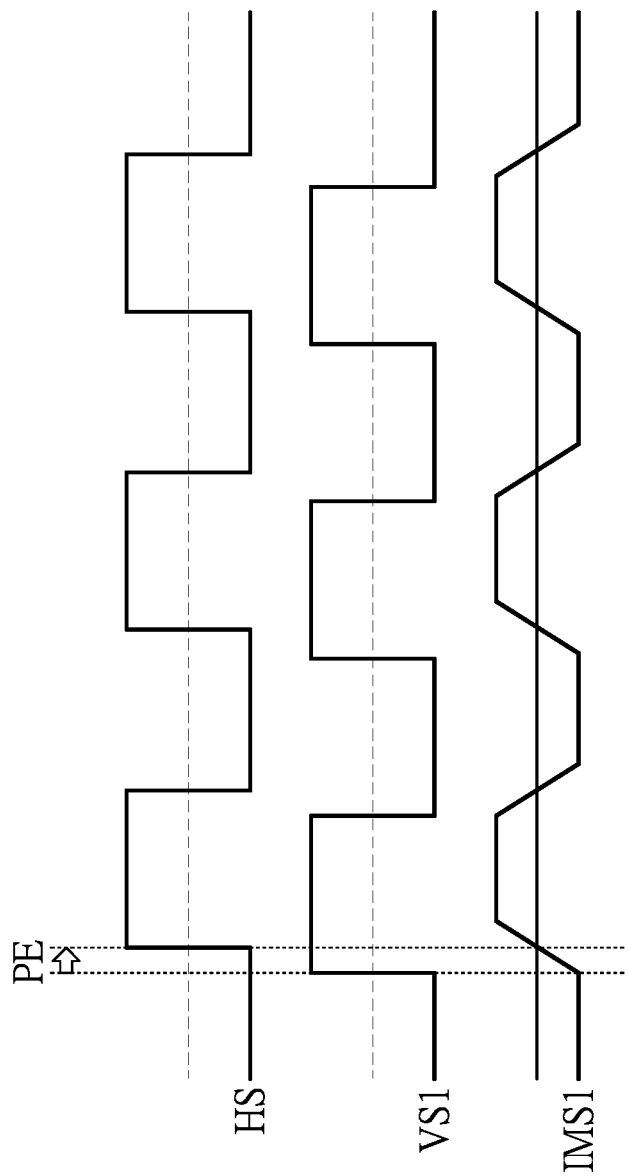
FIG. 9 is a waveform diagram of signals of a motor current controlling circuit having a voltage detection mechanism according to a seventh embodiment of the present disclosure.

Reference is made to FIG. 9, which is a waveform diagram of signals of a motor current controlling circuit having a voltage detection mechanism according to a seventh embodiment of the present disclosure. The same descriptions are not repeated herein.

The above-mentioned controller circuit 20 may subtract the second voltage Vout2 of the second node OUT2 from the first voltage Vout1 of the first node OUT1 to generate a voltage signal VS1 shown in FIG. 9.

It is worth noting that, the controller circuit 20 may receive a Hall level signal HS shown in FIG. 9 from the Hall signal unit 50 described above. In addition, the controller circuit 20 may receive a current detected signal IMS1 shown in FIG. 9 from the zero current detector circuit 30 described above. Then, the controller circuit 20 may, according to the current detected signal IMS1 and the Hall level signal HS, determine whether or not the current of the motor MT that is indicated by the current detected signal IMS1 is equal to the zero value at a transition time point of the Hall level signal HS.

In the embodiment, the transition time point of the Hall level signal HS may be a time point at which the Hall level signal HS transits from a low level to a high level. That is, the transition time point of the Hall level signal HS may be a time point of a rising edge of the Hall level signal HS. In practice, the transition time point may be a time point at which the Hall level signal HS transits from a high level to a low level. That is, the transition time point of the Hall level signal HS may be a time point of a falling edge of the Hall level signal HS.

When the controller circuit 20 determines that the current of the motor MT is not equal to the zero value at the transition time point of the Hall level signal HS, the controller circuit 20 may control the driver circuit 10 to switch the bridge circuit HB to adjust a phase of the Hall level signal HS such that the current of the motor MT is equal to the zero value at the transition time point of the Hall level signal HS.

For example, the controller circuit 20 may determine that the current of the motor MT is not equal to and is smaller than the zero value at the time point (that is the transition time point) at which the Hall level signal HS transits from the low level to the high level. Under this condition, the controller circuit 20 may shift a phase of the voltage signal VS1 forward by a phase angle PE. As a result, as shown in FIG. 9, the current of the motor MT that is indicated by the current detected signal IMS1 is equal to the zero value during a time interval that is near the time point (that is the transition time point) of the rising edge of the Hall level signal HS.

Conversely, the controller circuit 20 may determine that the current of the motor MT is not equal to and is larger than the zero value at the time point (that is the transition time point) at which the Hall level signal HS transits from the low level to the high level. Under this condition, the controller circuit 20 may shift the phase of the voltage signal VS1 backward by the phase angle PE. As a result, the current of the motor MT that is indicated by the current detected signal IMS1 is equal to the zero value during the time interval that is near the transition time point of the Hall level signal HS.

As described above, the controller circuit 20 may adjust the time interval that is near the transition time point of the Hall level signal HS to be aligned with a time point at which the current of the motor MT is equal to the zero value. In practice, the Hall level signal HS may be replaced with a back electromotive force (EMF) signal of the motor MT. The controller circuit 20 may adjust a time interval that is near a transition time point of the back electromotive force signal to be aligned with a time point at which the current of the motor MT is equal to the zero value. The controller circuit 20 may adjust the phase of the Hall level signal HS such that a preset phase difference exists between the Hall level signal HS and the back electromotive force signal.

Eighth Embodiment

Figure 10:
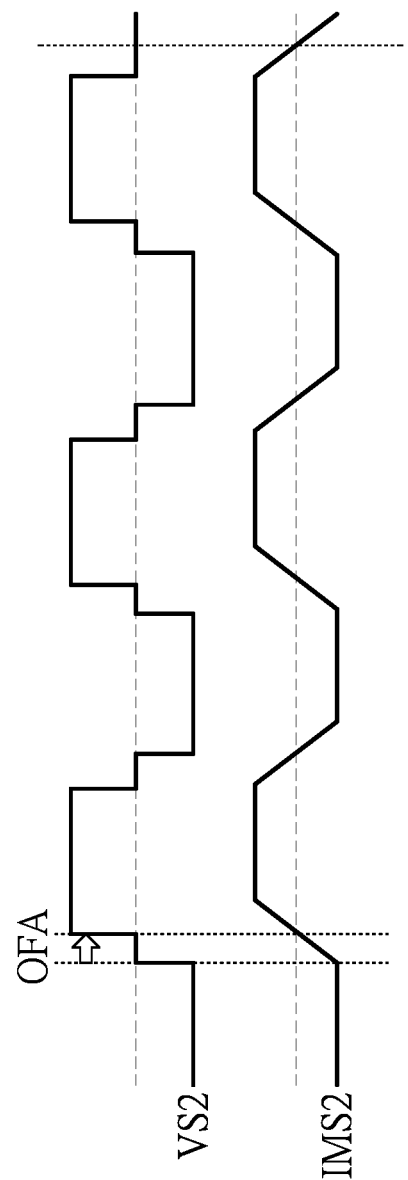
FIG. 10 is a waveform diagram of signals of a motor current controlling circuit having a voltage detection mechanism according to an eighth embodiment of the present disclosure.

Reference is made to FIG. 10, which is a waveform diagram of signals of a motor current controlling circuit having a voltage detection mechanism according to an eighth embodiment of the present disclosure. The same descriptions are not repeated herein.

The above-mentioned controller circuit 20 may receive a current detected signal IMS2 shown in FIG. 10 from the above-mentioned zero current detector circuit 30. The controller circuit 20 may subtract a signal of the second voltage Vout2 of the second node OUT2 from a signal of the first voltage Vout1 of the first node OUT1 to generate a voltage signal having a plurality of square waves. A voltage difference between the first voltage Vout1 of the first node OUT1 and the second voltage Vout2 of the second node OUT2 is a phase voltage of the motor.

The controller circuit 20 may, according to the voltage signal and the current detected signal IMS2, determine whether or not the current of the above-mentioned motor MT that is indicated by the current detected signal IMS2 is equal to the zero value at a transition time point of the voltage signal. For example, the transition time point of the voltage signal may be a time point at which a voltage of the voltage signal increases from the zero value to a value that is larger than the zero value.

The controller circuit 20 may determine that the current of the motor MT that is indicated by the current detected signal IMS2 is not equal to the zero value at a transition time point of the voltage signal. For example, the controller circuit 20 determines that the current of the motor MT is smaller than the zero value at the transition time point of the voltage signal. Under this condition, the controller circuit 20 may control the driver circuit 10 to switch the bridge circuit HB to extend a length of a time during which the first voltage Vout1 of the first node OUT1 is equal to the second voltage Vout2 of the second node OUT2 (such that the phase voltage of the motor approaches the zero value). The controller circuit 20 shifts a phase of the voltage signal (that is a signal of the phase voltage of the motor MT) backward by a phase angle OFA to form a voltage signal VS2 shown in FIG. 10. As a result, the current of the motor MT reaches the zero value at the transition time point of the voltage signal VS2.

Conversely, the controller circuit 20 may determine that the current of the motor MT that is indicated by the current detected signal IMS2 is larger than the zero value at a transition time point of the voltage signal. Under this condition, the controller circuit 20 may control the driver circuit 10 to switch the bridge circuit HB to shorten the length of the time during which the first voltage Vout1 of the first node OUT1 is equal to the second voltage Vout2 of the second node OUT2 (such that the phase voltage of the motor MT approaches the zero value). The controller circuit 20 may shift the phase of the voltage signal (that is the signal of the phase voltage of the motor MT) forward by the phase angle OFA. As a result, the current of the motor MT reaches the zero value at the transition time point of the voltage signal.

Ninth Embodiment

Figure 11:
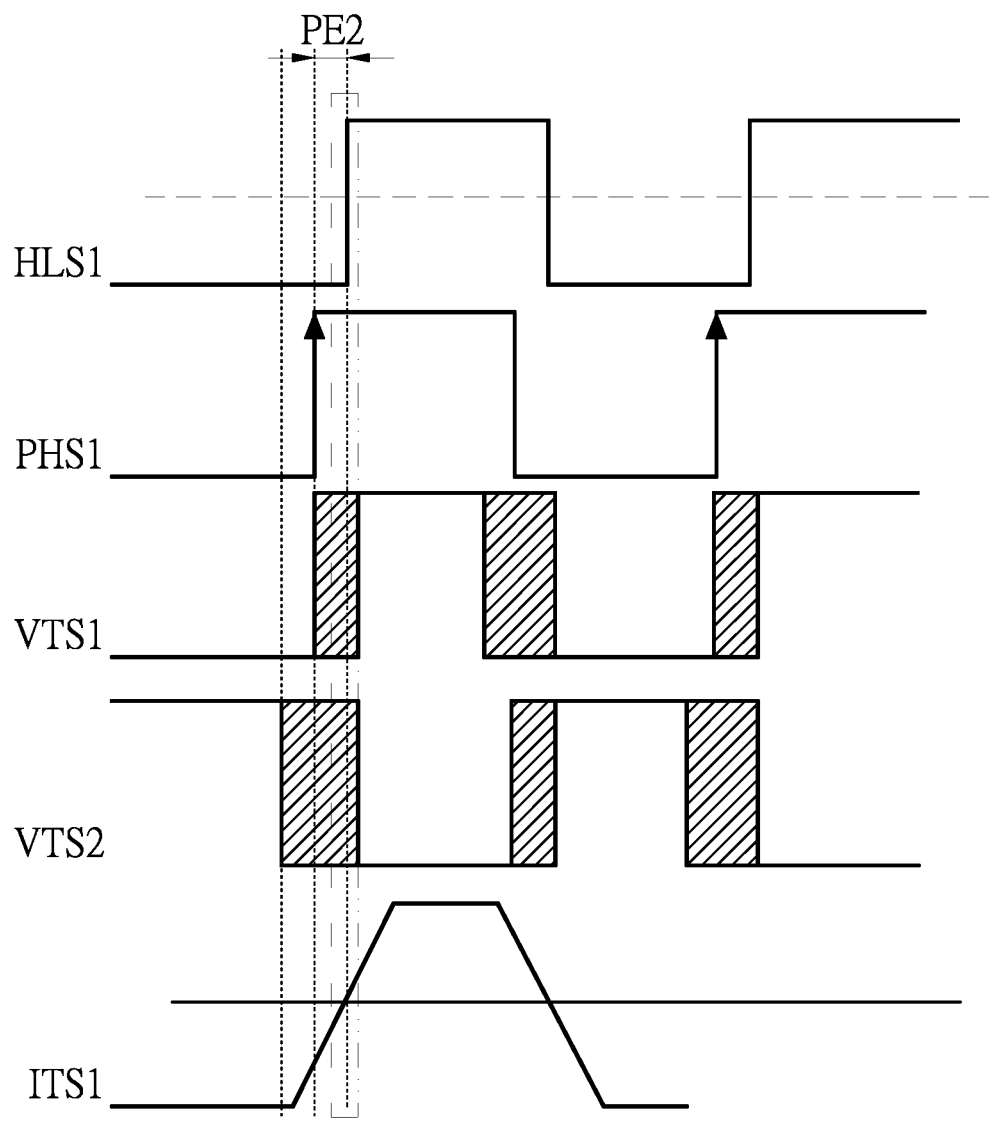
FIG. 11 is a waveform diagram of signals of a motor current controlling circuit having a voltage detection mechanism according to a ninth embodiment of the present disclosure.

Reference is made to FIG. 11, which is a waveform diagram of signals of a motor current controlling circuit having a voltage detection mechanism according to a ninth embodiment of the present disclosure.

The above-mentioned zero current detector circuit 30 may detect one or both of a signal VTS1 of the first voltage of the above-mentioned first node OUT1 and a signal VTS2 of the second voltage of the above-mentioned second node OUT2. The zero current detector circuit 30 may, according to one or both of the signal VTS1 and the signal VTS2, determine whether or not the current flowing through the above-mentioned motor MT is equal to the zero value to output a current detected signal ITS1.

The above-mentioned controller circuit 20 may determine whether or not the current of the motor MT that is indicated by the current detected signal ITS1 is equal to the zero value (during a time interval that is near) at a transition time point of a Hall level signal HLS1 (or a commutation signal PHS1 in practice).

In the embodiment, the transition time point of the Hall level signal HLS1 may be a time point at which the Hall level signal HLS1 transits from a low level to a high level. That is, the transition time point of the Hall level signal HLS1 may be a time point of a rising edge of the Hall level signal HLS1. In practice, the transition time point of the Hall level signal HLS1 may be a time point at which the Hall level signal HLS1 transits from the high level to the low level. That is, the transition time point of the Hall level signal HLS1 may be a time point of a falling edge of the Hall level signal HLS1.

When the controller circuit 20 determines that the current of the motor MT is not equal to the zero value at the transition time point of the Hall level signal HLS1 (or the commutation signal PHS1 in practice), the controller circuit 20 may control the driver circuit 10 to switch the bridge circuit HB to adjust a phase of a signal of a phase voltage (or a phase of the commutation signal PHS1 in practice). For example, the controller circuit 20 may shift the phase of the signal of the phase voltage by a phase angle PE2. As a result, the current of the motor MT is equal to the zero value at the transition time point of the Hall level signal HLS1 (or the commutation signal PHS1 in practice).

Tenth Embodiment

Figure 12:
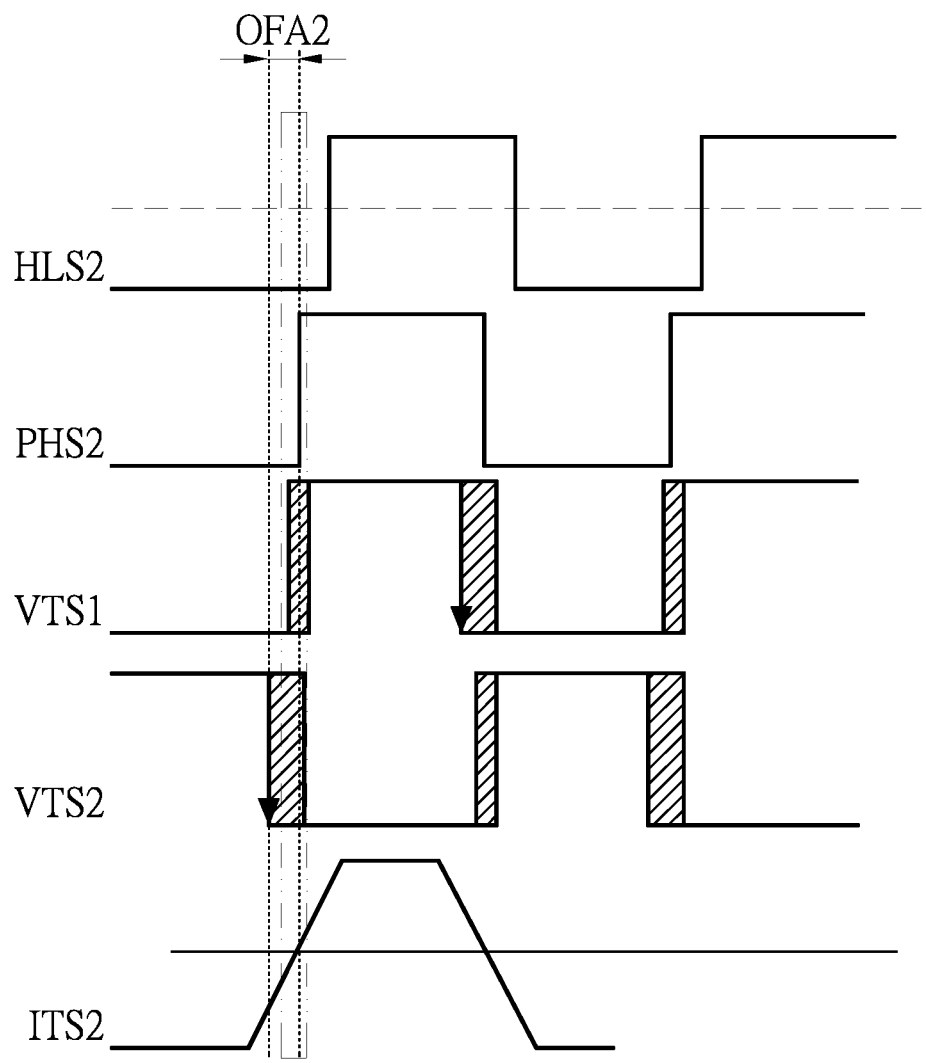
FIG. 12 is a waveform diagram of signals of a motor current controlling circuit having a voltage detection mechanism according to a tenth embodiment of the present disclosure.

Reference is made to FIG. 12, which is a waveform diagram of signals of a motor current controlling circuit having a voltage detection mechanism according to a tenth embodiment of the present disclosure.

The above-mentioned zero current detector circuit 30 may detect one or both of the signal VTS1 of the first voltage of the above-mentioned first node OUT1 and the signal VTS2 of the second voltage of the above-mentioned second node OUT2. The zero current detector circuit 30 may, according to one or both of the signal VTS1 of the first voltage and the signal VTS2 of the second voltage, determine whether or not the current flowing through the above-mentioned motor MT is equal to the zero value to output a current detected signal ITS2.

The above-mentioned controller circuit 20 may, according to the current detected signal ITS2, determine whether or not the current of the motor MT that is indicated by the current detected signal ITS2 is equal to the zero value at a commutation time point (that is a transition time point) of a commutation signal PHS2. In the embodiment, the transition time point of the commutation signal PHS2 may be a time point at which the commutation signal PHS2 transits from a low level to a high level. That is, the transition time point of the commutation signal PHS2 may be a time point of a rising edge of the commutation signal PHS2. In practice, the transition time point of the commutation signal PHS2 may be a time point at which the commutation signal PHS2 transits from the high level to the low level. That is, the transition time point of the commutation signal PHS2 may be a time point of a falling edge of the commutation signal PHS2.

When the controller circuit 20 determines that the current of the motor MT that is indicated by the current detected signal ITS2 is not equal to the zero value at the commutation time point of the commutation signal PHS2, the controller circuit 20 may control the driver circuit 10 to switch the bridge circuit HB to adjust a phase of the commutation signal PHS2 (or the signal of the phase voltage) of the motor MT. For example, the phase of the commutation signal PHS2 (or the signal of the phase voltage) is shifted by a closed interval angle OFA2. As a result, the current of the motor MT is equal to the zero value at the commutation time point (that is the transition time point) of the commutation signal PHS2.

In summary, the present disclosure provides the motor current controlling circuit having the voltage detection mechanism, which has the following characteristics:

1. the first voltage of the first node between the first terminal of the first low-side transistor and the second terminal of the first high-side transistor can be detected, and the motor current controlling circuit determines whether or not the current flowing through the motor is equal to the zero value according to the detected first voltage;
2. the second voltage of the second node between the first terminal of the second low-side transistor and the second terminal of the second high-side transistor can be detected, and the motor current controlling circuit determines whether or not the current flowing through the motor is equal to the zero value according to the detected second voltage;
3. the voltage of the resistor connected to the second terminal of the first low-side transistor and the second terminal of the second low-side transistor may be detected, and the motor current controlling circuit determines whether or not the current flowing through the motor is larger than the threshold according to the detected voltage of the resistor;
4. a commutation angle of the motor being driven may be automatically adjusted according to the detected current of the motor; and
5. the time length of the time interval during which the first voltage of the first terminal of the motor is not equal to but approaches the second voltage of the second terminal of the motor may be automatically adjusted according to the detected current of the motor.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A motor current controlling circuit having a voltage detection mechanism, which is applicable to a motor, the motor current controlling circuit having the voltage detection mechanism comprising:
    a bridge circuit including a plurality of transistors, wherein the plurality of transistors includes:
        a first high-side transistor, wherein a first terminal of the first high-side transistor is coupled to a common voltage;
        a first low-side transistor, wherein a first terminal of the first low-side transistor is connected to a second terminal of the first high-side transistor, a first node between the first terminal of the first low-side transistor and the second terminal of the first high-side transistor is connected to a first terminal of the motor, and a second terminal of the first low-side transistor is grounded;
        a second high-side transistor, wherein a first terminal of the second high-side transistor is coupled to the common voltage; and
        a second low-side transistor, wherein a first terminal of the second low-side transistor is connected to a second terminal of the second high-side transistor, a second node between the first terminal of the second low-side transistor and the second terminal of the second high-side transistor is connected to a second terminal of the motor, and a second terminal of the second low-side transistor is grounded;
    a zero current detector circuit connected to the motor and configured to detect one or both of a voltage of the first node and a voltage of the second node as a first voltage and a second voltage, respectively, and wherein the zero current detector circuit, according to one or both of the first voltage and the second voltage, determines whether or not a current flowing through the motor is equal to a zero value for outputting a current detected signal;
    a driver circuit connected to a control terminal of each of the plurality of transistors and configured to turn on or off each of the plurality of transistors; and
    a controller circuit connected to the driver circuit and the zero current detector circuit, and configured to control the driver circuit according to the current detected signal;
    wherein the controller circuit determines a value of the current of the motor according to the current detected signal, and when the controller circuit determines that the current of the motor is not equal to the zero value during a time interval that is near a transition time point of a signal of the first voltage or the second voltage, the controller circuit controls the driver circuit to switch the bridge circuit to extend or shorten a length of a time during which the first voltage of the first node is equal to the second voltage of the second node.

2. The motor current controlling circuit having the voltage detection mechanism according to claim 1, further comprising:
    a Hall sensor connected to the controller circuit, wherein the Hall sensor is configured to sense a positive voltage and a negative voltage that are generated with a change in magnetic field strength from rotation of a rotor of the motor, so as to output a Hall signal, and the controller circuit controls the driver circuit based on the Hall signal.

3. The motor current controlling circuit having the voltage detection mechanism according to claim 2, further comprising:
    a Hall signal unit connected between the Hall sensor and the controller circuit, wherein the Hall signal unit is configured to generate a Hall level signal according to a level of the Hall signal from the Hall sensor, and the controller circuit is configured to control the driver circuit according to the Hall level signal.

4. The motor current controlling circuit having the voltage detection mechanism according to claim 3, wherein when the controller circuit, according to the Hall level signal and the current detected signal, determines that the current of the motor is not equal to the zero value during a time interval that is near a transition time point of the Hall level signal, the controller circuit controls the driver circuit to switch the bridge circuit such that a time point at which the motor commutates is adjusted, and the current of the motor is equal to the zero value during the time interval that is near the transition time point of the Hall level signal.

5. The motor current controlling circuit having the voltage detection mechanism according to claim 1, further comprising:
    a resistor, wherein a first terminal of the resistor is connected to the second terminal of the first low-side transistor and the second terminal of the second low-side transistor, and a second terminal of the resistor is grounded; and a current limiting circuit connected to the first terminal of the resistor and the controller circuit and configured to detect a voltage of the resistor, wherein the current limiting circuit, according to a voltage of the resistor, determines whether or not a current flowing through the resistor is larger than a threshold or falls within a threshold range to output a current limiting signal to the controller circuit, and the controller circuit controls the driver circuit according to the current limiting signal.

6. The motor current controlling circuit having the voltage detection mechanism according to claim 1, wherein the zero current detector circuit includes:

a comparator, wherein a first input terminal of the comparator is coupled to a reference voltage, a second input terminal of the comparator is connected to the first node, and the comparator compares the first voltage with the reference voltage to output a comparing signal; and a logic circuit connected to an output terminal of the comparator and the controller circuit, wherein the logic circuit, according to the comparing signal, determines whether or not the current flowing through the motor is equal to the zero value to output the current detected signal.

7. The motor current controlling circuit having the voltage detection mechanism according to claim 1, wherein the zero current detector circuit is connected to the second node and configured to detect the second voltage of the second node, and wherein the zero current detector circuit, according to the second voltage, determines whether or not the current flowing through the motor is equal to the zero value to output the current detected signal.

8. The motor current controlling circuit having the voltage detection mechanism according to claim 1, wherein the zero current detector circuit includes:

a comparator, wherein a first input terminal of the comparator is connected to the second node, a second input terminal of the comparator is coupled to a reference voltage, and the comparator compares the second voltage of the second node with the reference voltage to output a comparing signal; and a logic circuit connected to an output terminal of the comparator and the controller circuit, wherein the logic circuit, according to the comparing signal, determines whether or not the current flowing through the motor is equal to the zero value to output the current detected signal.

9. The motor current controlling circuit having the voltage detection mechanism according to claim 1, wherein the zero current detector circuit includes:

a first comparator, wherein a first input terminal of the first comparator is coupled to a first reference voltage, a second input terminal of the first comparator is connected to the first node, and the first comparator compares the first voltage with the first reference voltage to output a first comparing signal;

a second comparator, wherein a first input terminal of the second comparator is connected to the second node, a second input terminal of the comparator is coupled to a second reference voltage, and the second comparator compares the second voltage of the second node with the second reference voltage to output a second comparing signal; and a logic circuit connected to an output terminal of the first comparator, an output terminal of the second comparator, and the controller circuit, and wherein the logic circuit, according to the first comparing signal and the second comparing signal, determines whether or not the current flowing through the motor is equal to the zero value to output the current detected signal.

* * * * *